US011225167B2

(12) United States Patent
Irwin

(10) Patent No.: US 11,225,167 B2
(45) Date of Patent: Jan. 18, 2022

(54) ELECTRIC CART

(71) Applicant: Kelly Irwin, Rogers, AR (US)

(72) Inventor: Kelly Irwin, Rogers, AR (US)

(73) Assignee: Assembled Products Corporation, Rogers, AR (US)

( * ) Notice: Subject to any disclaimer, the term of this patent is extended or adjusted under 35 U.S.C. 154(b) by 204 days.

(21) Appl. No.: 16/590,229

(22) Filed: Oct. 1, 2019

(65) Prior Publication Data
US 2020/0156501 A1 May 21, 2020

Related U.S. Application Data

(60) Provisional application No. 62/740,341, filed on Oct. 2, 2018.

(51) Int. Cl.
B60L 58/13 (2019.01)
B62K 11/14 (2006.01)
B60W 10/08 (2006.01)
B62B 5/00 (2006.01)

(52) U.S. Cl.
CPC ............ B60L 58/13 (2019.02); B60W 10/08 (2013.01); B62B 5/0033 (2013.01); B62K 11/14 (2013.01)

(58) Field of Classification Search
CPC ...... B60L 58/13; B60W 10/08; B62B 5/0033; B62K 11/14
See application file for complete search history.

(56) References Cited

U.S. PATENT DOCUMENTS

| | | | | |
|---|---|---|---|---|
| 3,904,947 A * | 9/1975 | Crews | ..................... | B60L 50/52 320/138 |
| 4,634,941 A * | 1/1987 | Klimo | .................. | A61G 5/1054 318/139 |
| 5,136,230 A * | 8/1992 | Gayler | .................. | H02J 7/0032 320/127 |
| 5,272,386 A * | 12/1993 | Kephart | .................. | H02J 9/002 307/116 |
| 5,350,982 A * | 9/1994 | Seib | ........................ | B60L 50/52 318/139 |
| 7,023,177 B1 * | 4/2006 | Bussinger | .................. | B62J 7/06 320/109 |
| 7,108,090 B2 * | 9/2006 | Turner | .................. | B60K 7/0007 180/65.51 |
| 7,699,128 B1 * | 4/2010 | Strauss | .................... | B62B 5/002 180/65.1 |
| 7,841,436 B2 * | 11/2010 | Bussinger | ............. | G06F 9/4856 180/214 |
| 9,452,767 B2 * | 9/2016 | Falcaro | ..................... | B62B 1/20 |
| 9,493,206 B1 | 11/2016 | Oh | | |
| 9,652,956 B2 | 5/2017 | Falkenberg et al. | | |
| 9,701,190 B2 | 7/2017 | Biderman et al. | | |
| 10,351,201 B1 * | 7/2019 | Wright | ........................ | B62J 9/21 |
| 2002/0003055 A1 * | 1/2002 | Leitner | .................... | B62M 7/00 180/170 |

(Continued)

Primary Examiner — Bryan A Evans
(74) Attorney, Agent, or Firm — Boyd D. Cox

(57) ABSTRACT

An electric shopping cart having an override that can be activated when the cart is cutoff during use due to a low battery condition. The override allows extra run time to be activated in order that the cart can be driven to a recharging area to recharge the battery for future use. In addition, thumb throttles on the electric shopping cart have magnets that return the throttles to a neutral position.

23 Claims, 7 Drawing Sheets

(56) References Cited

U.S. PATENT DOCUMENTS

| | | | |
|---|---|---|---|
| 2003/0085064 A1* | 5/2003 | Turner | B62B 5/0026 |
| | | | 180/65.51 |
| 2005/0072611 A1* | 4/2005 | Lin | B62D 25/10 |
| | | | 180/69.2 |
| 2006/0225929 A1* | 10/2006 | Chen | B62K 15/006 |
| | | | 180/65.1 |
| 2007/0107963 A1* | 5/2007 | Chiu | H01M 50/256 |
| | | | 180/68.5 |
| 2009/0095547 A1* | 4/2009 | Swett | B60K 1/00 |
| | | | 180/65.1 |
| 2011/0120786 A1* | 5/2011 | Lin | 180/62 |
| 2011/0279252 A1* | 11/2011 | Carter | B60T 7/16 |
| | | | 340/426.11 |
| 2013/0098698 A1* | 4/2013 | Johnson | A47L 11/24 |
| | | | 180/65.1 |
| 2013/0175103 A1* | 7/2013 | Flowers | H01R 13/629 |
| | | | 180/65.1 |
| 2016/0268561 A1* | 9/2016 | Held | H01M 50/20 |
| 2018/0101179 A1* | 4/2018 | Louey | B60L 50/52 |
| 2019/0021920 A1* | 1/2019 | Cooper | F03C 2/00 |
| 2019/0049977 A1* | 2/2019 | Dean | G05D 1/0278 |
| 2019/0053963 A1* | 2/2019 | Hoysan | A61M 16/10 |
| 2019/0217912 A1* | 7/2019 | Schneider | B62K 5/027 |
| 2019/0225294 A1* | 7/2019 | Schneider | B60L 50/66 |

* cited by examiner

ELECTRIC CART

Priority for this application is claimed from U.S. Provisional Application No. 62/740,341 entitled "Electric Cart" filed on Oct. 2, 2018

The present invention is directed to an electric cart typically used by mobility impaired customers shopping in retail stores.

Individuals with limited mobility generally have difficulty in places like shopping areas. The current availability of electric carts in retail stores makes it easier for shoppers lacking mobility to get around.

The carts are typically electric and rely on rechargeable batteries for power. However, the battery often dies when the cart is at a location away from the recharging station. When this occurs, it is necessary to manually push or pull the cart to the recharging station. To manually move the cart can cumbersome and difficult and the personnel to perform the task may not be available when needed.

With so much use, the carts used in commercial areas can require frequent maintenance. Accessibility to the parts of a cart needing repair is not always easy, particularly when those parts are only accessible from different areas of the cart. This makes maintenance difficult and time consuming.

Diagnosing mechanical problems on carts can sometimes be a guessing game in which the mechanic uses trial and error when making repairs in order to determine which part needs to be replaced or what service needs to be performed. This trial and error method is inefficient for maintaining a reliable cart and also can result in unnecessary repairs and costs.

Also, when the battery on an electric cart runs out ox power, typically there is no warning for the user. The cart stops right where the battery expires, which can result in a user with limited mobility being stranded.

Electric carts are typically equipped with hand-operated throttles. Such hand throttles require the user to grasp and twist the throttle in order to control the speed of the cart. During prolonged cart use, the user's wrist and hand often become fatigued when holding the throttle in a certain position for a period of time, thereby limiting the length of time the user can drive the cart and discouraging the user from shopping.

When the battery expires on an electric cart, the cart cuts off and does not restart until the battery has been recharged. In these instances, the cart has to be manually moved to a recharging area, usually by pushing and/or pulling that is done by maintenance personnel.

Typically, the throttle on an electric cart is located on the steering mechanism, such as a handle. By grasping the throttle and applying torque to twist the throttle, the user can activate the motor and cause the cart to move. However, the user must continuously grip and hold the throttle in order to operate the cart. Such conventional hand throttles typically have spring returns so that when the throttle is released, the spring returns the throttle to a neutral position where the cart speed is zero. However, as the user rotates the throttle, the cart speed increases, and the rotational resistance imparted by the spring increases. This increased resistance makes it mere difficult to turn the throttle and to hold the throttle's position as the cart's speed increases. Consequently, such a throttle an be especially challenging for a cart user having limited use of their hands or arms.

Electric carts lack diagnostic systems for determining the carts' mechanical failures. Consequently, without the diagnostic information obtained from a diagnostic system, unnecessary repairs are often made to electric carts. Such unnecessary repairs can increase repair time spent on the carts and thereby increase the maintenance costs for the carts.

The electric cart of the present invention has power-stop override that can provide power to the motor after the cart has cutoff in order to allow the cart to be driven to a recharging station. In addition, the cart has a state of charge (SoC) that tracks the battery's capacity and adjusted run time to allow for extra power to the motor after power has been cut off due to a low charge condition.

The cart throttle of the electric cart has thumb throttles with rare earth magnets that enable a user to control the speed of the cart by pressing the throttles with their digits. The magnets act to return the throttle to a neutral position when the thumb throttles are released. By using the thumbs and/or fingers to control the speed of the cart, a driver avoids twisting his or her hands and wrists to operate the throttle, thereby enabling the driver to relax hands, arms and shoulders while driving. Consequently, the thumb throttles eliminate discomfort created by conventional throttles and can extend the amount of time that a user can drive the cart.

A display is provided on the cart that has human readable error codes that can be used with other diagnostic tools that allow maintenance personnel to identify and fix issues with the cart. This can help to alleviate unnecessary parts replacement, thereby reducing service costs and time spent on repairs. In addition, the display gives operational instructions for the user and indicates if the cart is ready for use or not.

SUMMARY

The present invention is an electric shopping cart of the commercial type that is generally used in retail stores by shoppers lacking mobility. However, the cart's use is not necessarily limited to commercial retail use. The cart has an override that can be activated when the cart is cutoff due to a low battery condition. The override allows extra run time to be activated on the cart so that the cart can be driven to a recharging area to recharge the battery for future use. In addition, the electric cart has thumb throttles that provide an ergonomic solution for users having difficulty driving electric carts with conventional throttles.

It is an object of the present invention to provide an electric cart that can be driver, after the cart has cutoff from a low battery condition.

It is a further object of the present invention to provide an electric cart having an override to run the cart after it has cutoff due to a low battery condition.

It is a further object of the present invention to provide a throttle on an electric cart that includes magnets to facilitate the return of the throttle to a neutral position.

It is a further object of the present invention to provide a diagnostic system for an electric cart that can alleviate unnecessary parts replacement and maintenance.

It is a further object of the present invention to provide a diagnostic system for an electric cart that can reduce repair time and service costs.

It is a further object of the present invention to provide an electric shopping cart with a diagnostic menu that indicates the electrical and operational state of the cart in real time.

It is a further object of the present invention to provide an electric cart with a display comprising a diagnostic menu to identify information about the cart.

It is a further object of the present invention to provide an electric shopping cart with a tight turning radius.

It is a further object of the present invention to provide an electric cart having a consolidated operating system that can be accessed in a single, central location.

It is a further object of the present invention to provide an electric cart with a battery having increased capacity and longevity.

It is a further object of the present invention to provide an electric cart having a feature that prevents the battery from being discharged too deeply such that the life span of the battery is increased.

It is a further object of the present invention to provide an electric cart that can be readily serviced.

It is a further object of the present invention to provide an electric cart, with a global positioning system (GPS) for use in determining the location of the cart.

It is a further object of the present invention to provide an electric cart with a display having a diagnostic menu that identifies remaining run time of the cart.

It is a further object of the present invention to provide an electric cart with a perimeter guardian system that deters theft or loss of the cart.

It is a further object of the present invention to provide an electric cart with a service menu that includes operational instructions on a display.

BRIEF DESCRIPTION OF THE DRAWINGS

Reference is made to the accompanying drawings in which are shown illustrative embodiments of the invention and from which novel features and advantages will be apparent.

DETAILED DESCRIPTION

The present invention is an electric cart (100) typically provided for users lacking mobility for transport when shopping. The cart (100) comprises a cart body (101), an electric power system, a control system, a steering system, and a perimeter guardian system. The electric power system comprises means for powering the cart.

Figure 1:
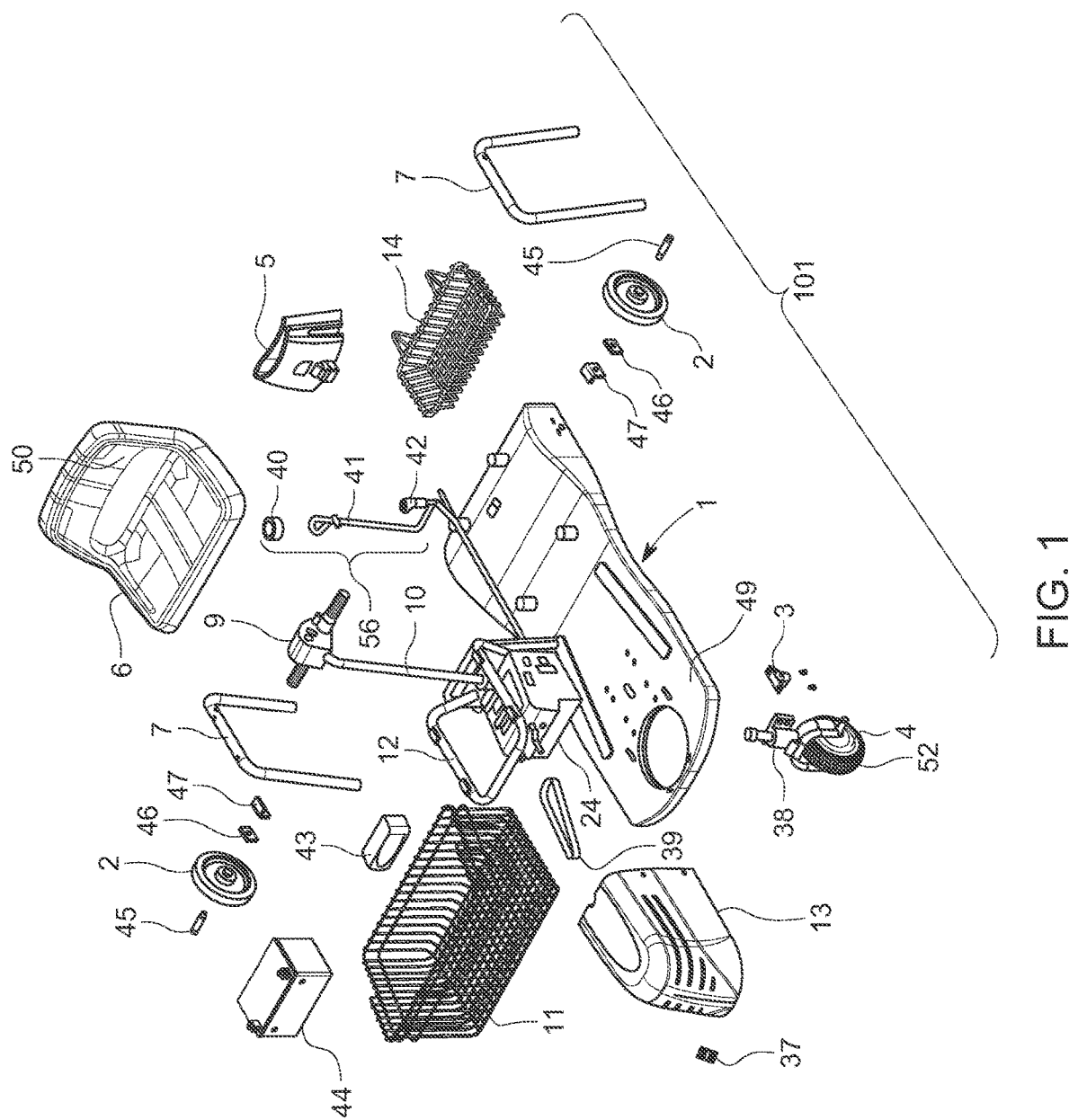
FIG. 1 is an exploded, perspective view of the electric cart of the present invention.
Figure 4:
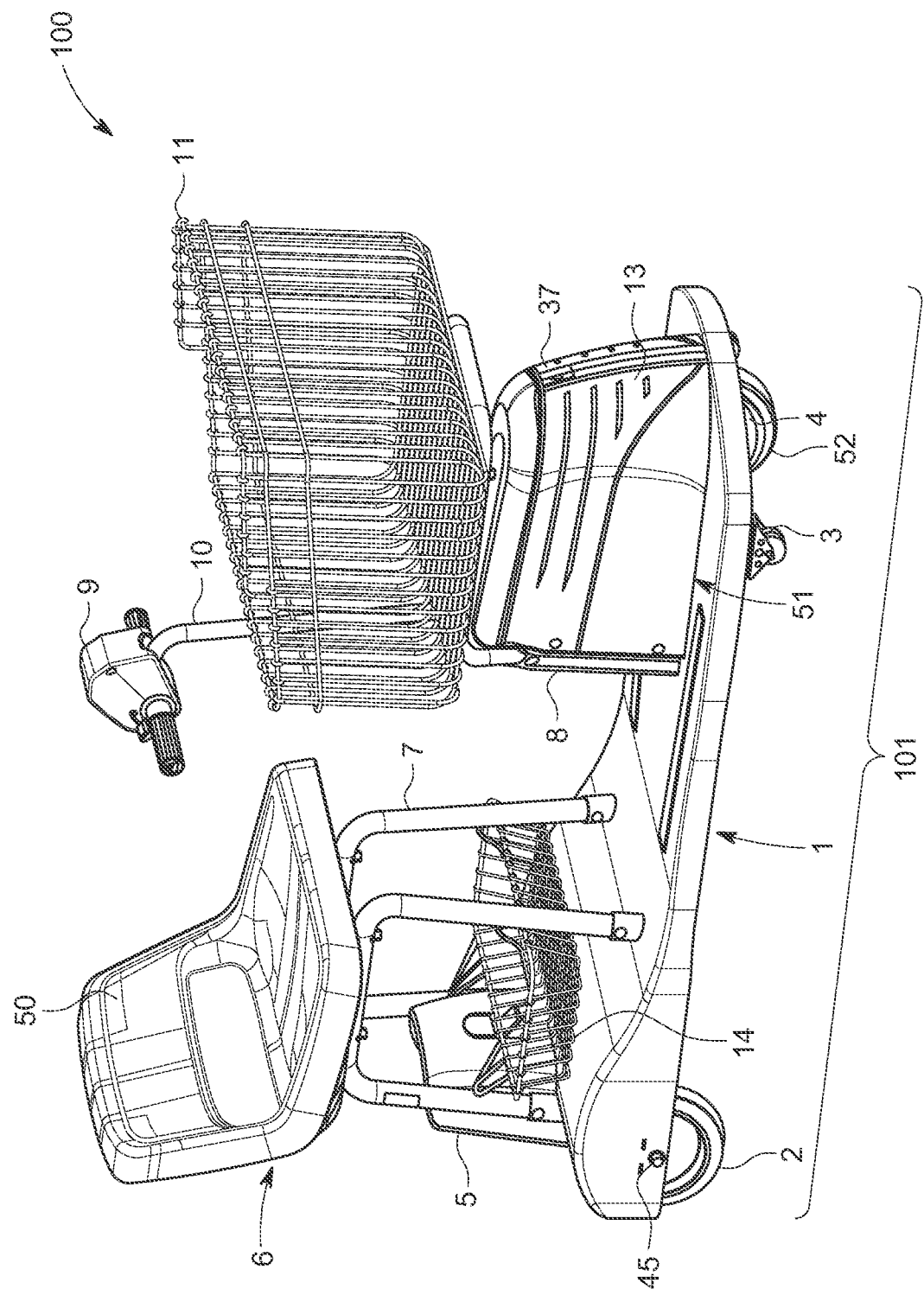
FIG. 4 is a perspective view of the electric cart of FIG. 1.
Figure 5:
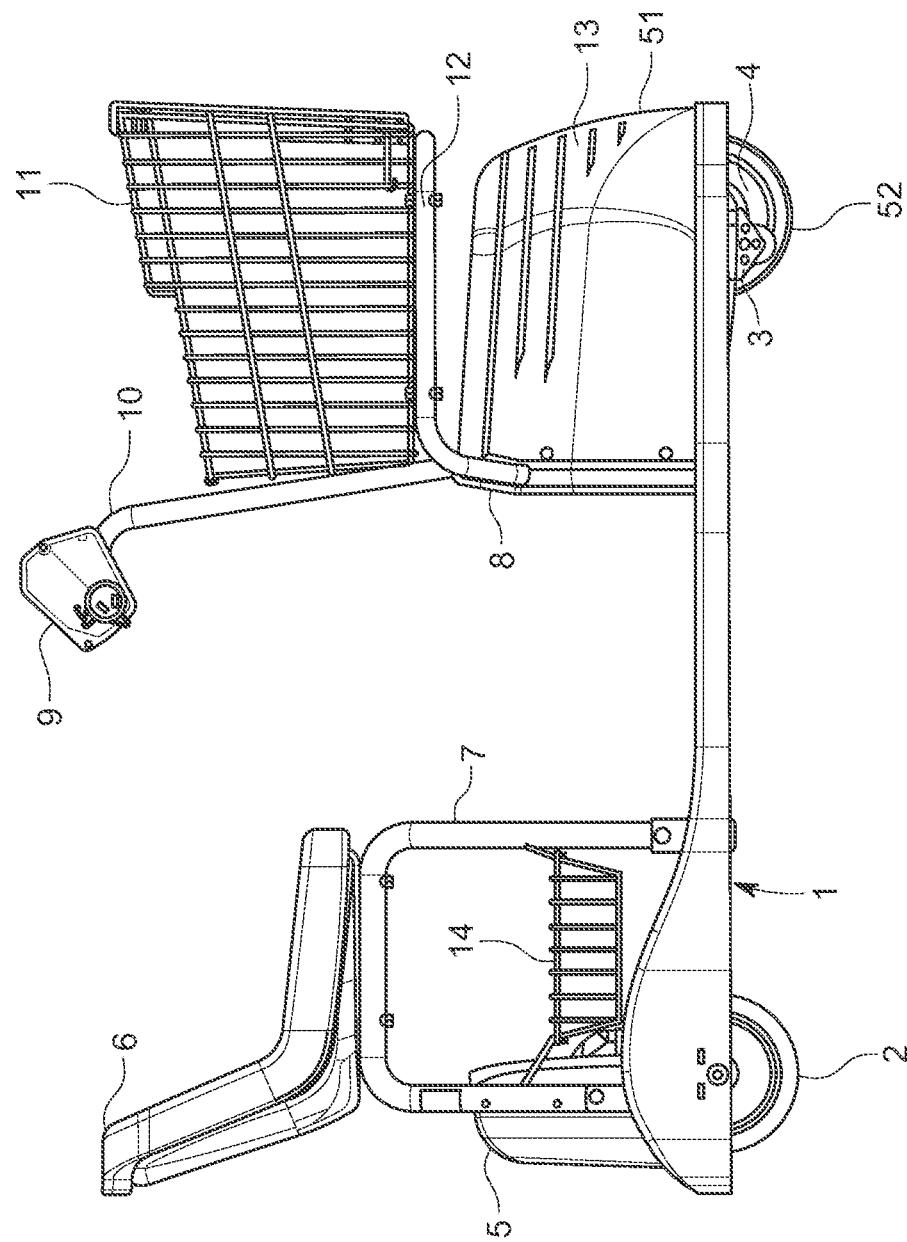
FIG. 5 is a side view of the electric cart of FIG. 1.
Figure 6:
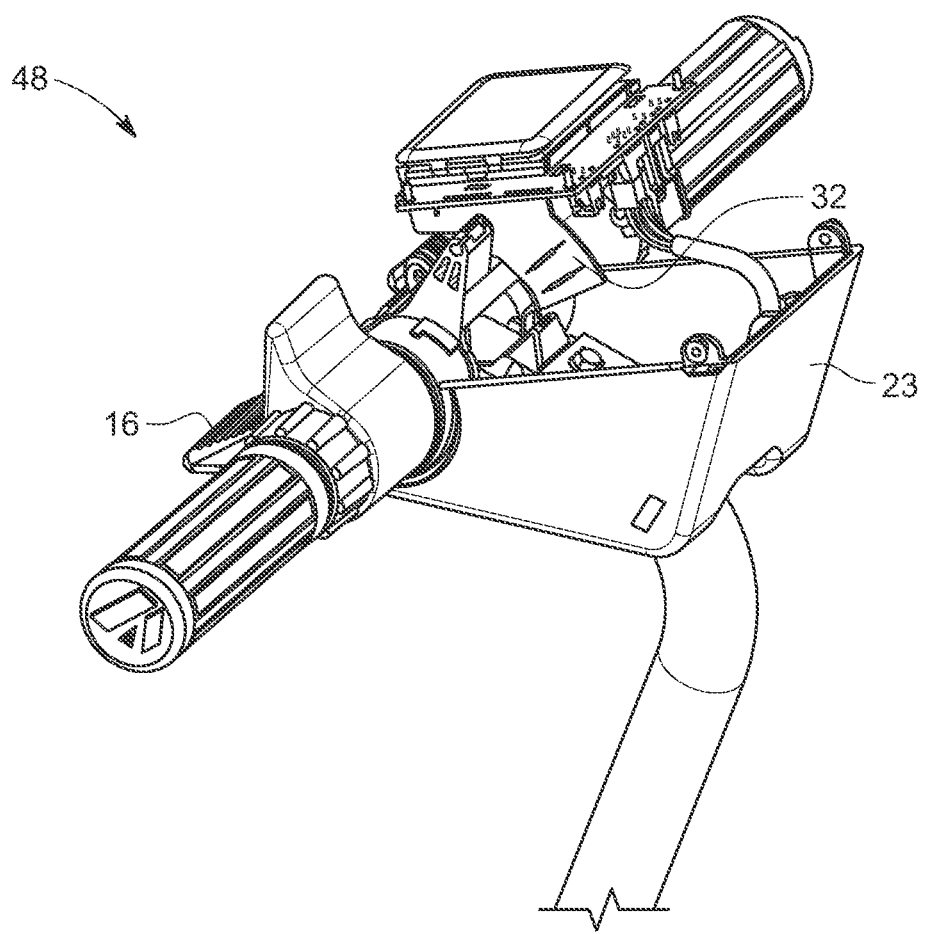
FIG. 6 is a partial front perspective view of the steering system and the cart throttle of the electric cart of FIG. 1.
Figure 7:
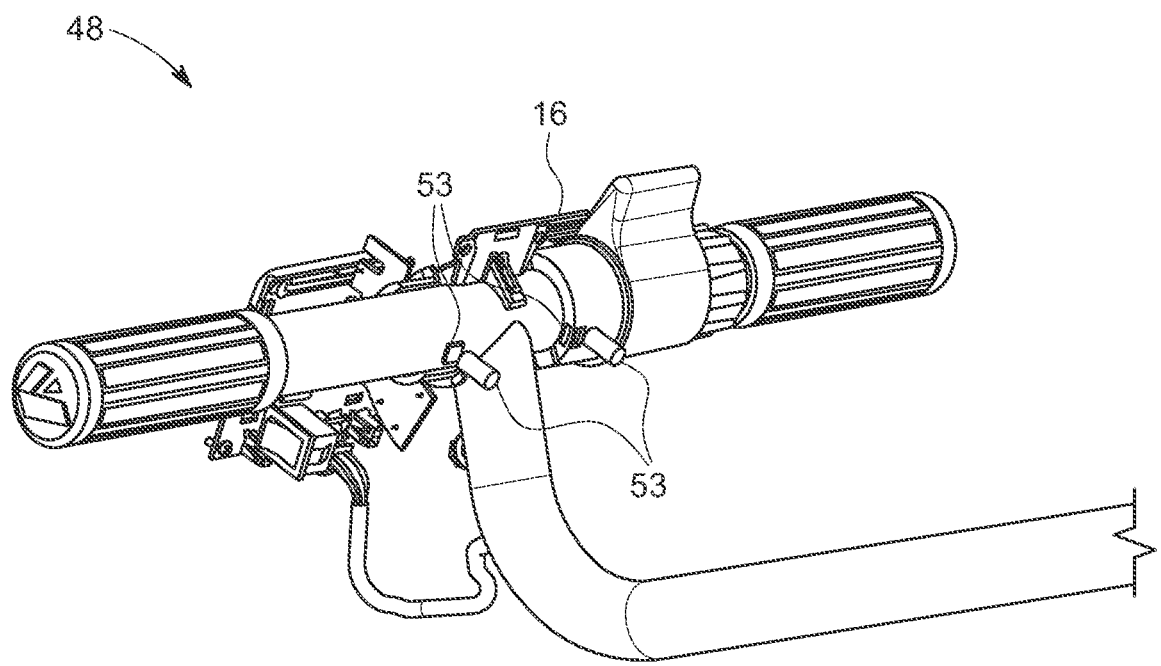
FIG. 7 is a partial back perspective view of the electric cart of FIG. 1.

As shown in FIGS. 1 and 4, the cart body (101) comprises a seat (6), a frame (1), a plurality of rear wheels (2), and a front wheel (52).

The seat (6) includes seat supports (7) and a cradle (50) that serves as passenger seating.

The frame (1) comprises a platform (49) preferable of unibody construction, a front stabilizer (3), and a protective shell (51). The protective shell (51) includes a front cover (13), a back cover (8), and a snap-in front plate cover (37).

Attached to the frame (1) are the rear wheels (2). Each of the rear wheels (2) has a rear axle bolt (45), a wheel backing plate (47), and wheel stiffener (46).

The cart body (101) also includes means for storing. The means for storing includes a plurality of receptacles. The plurality of receptacles includes a primary receptacle (11), a secondary receptacle (14), and a cord receptacle (5). In a preferred embodiment, the primary (11) and secondary (14) receptacles are baskets. However, other suitable receptacles could be substituted therefor.

Steering System

Figure 2:
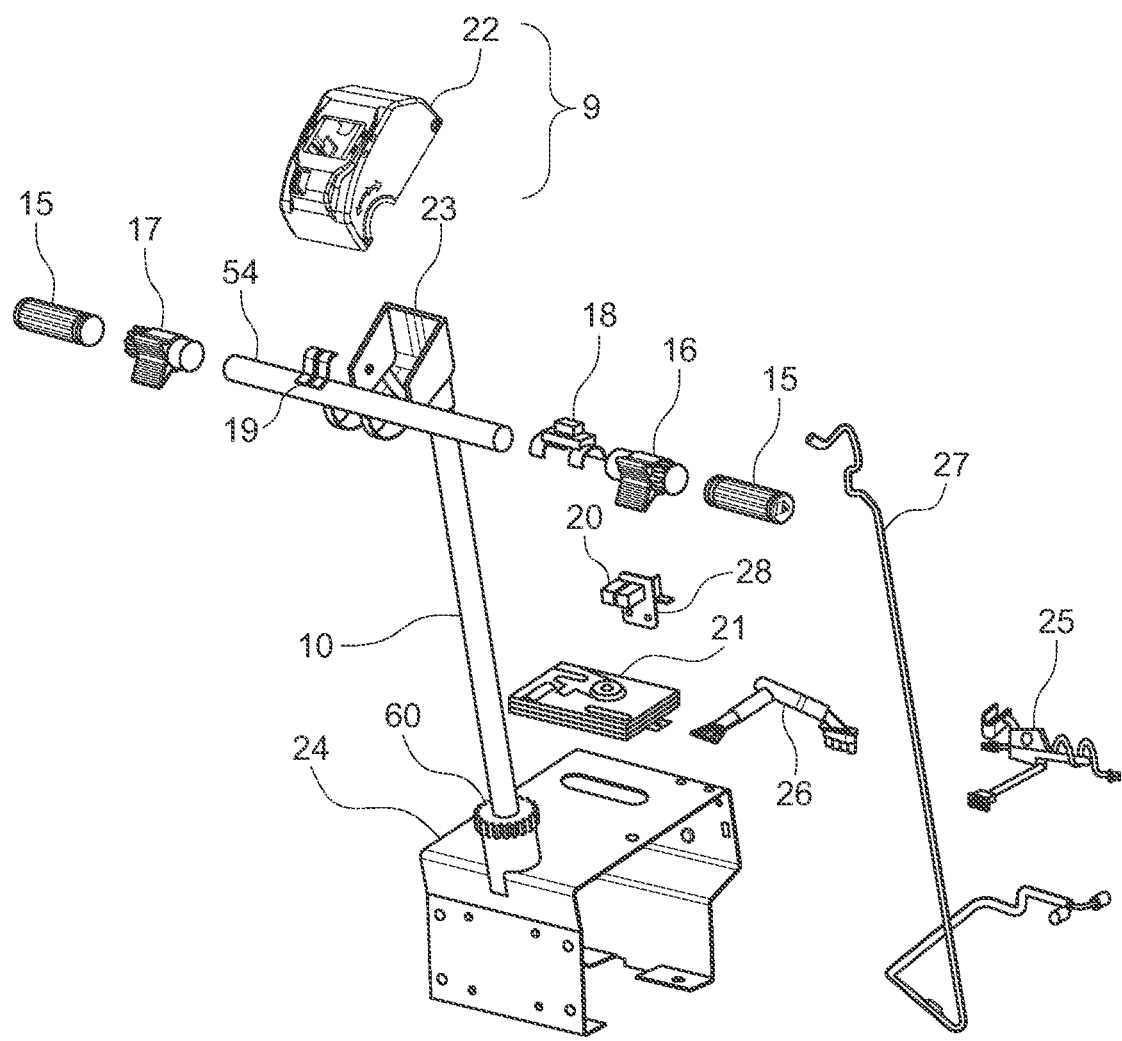
FIG. 2 is an exploded, partial perspective view of the steering system and throttle of the electric cart of FIG. 1.
Figure 3:
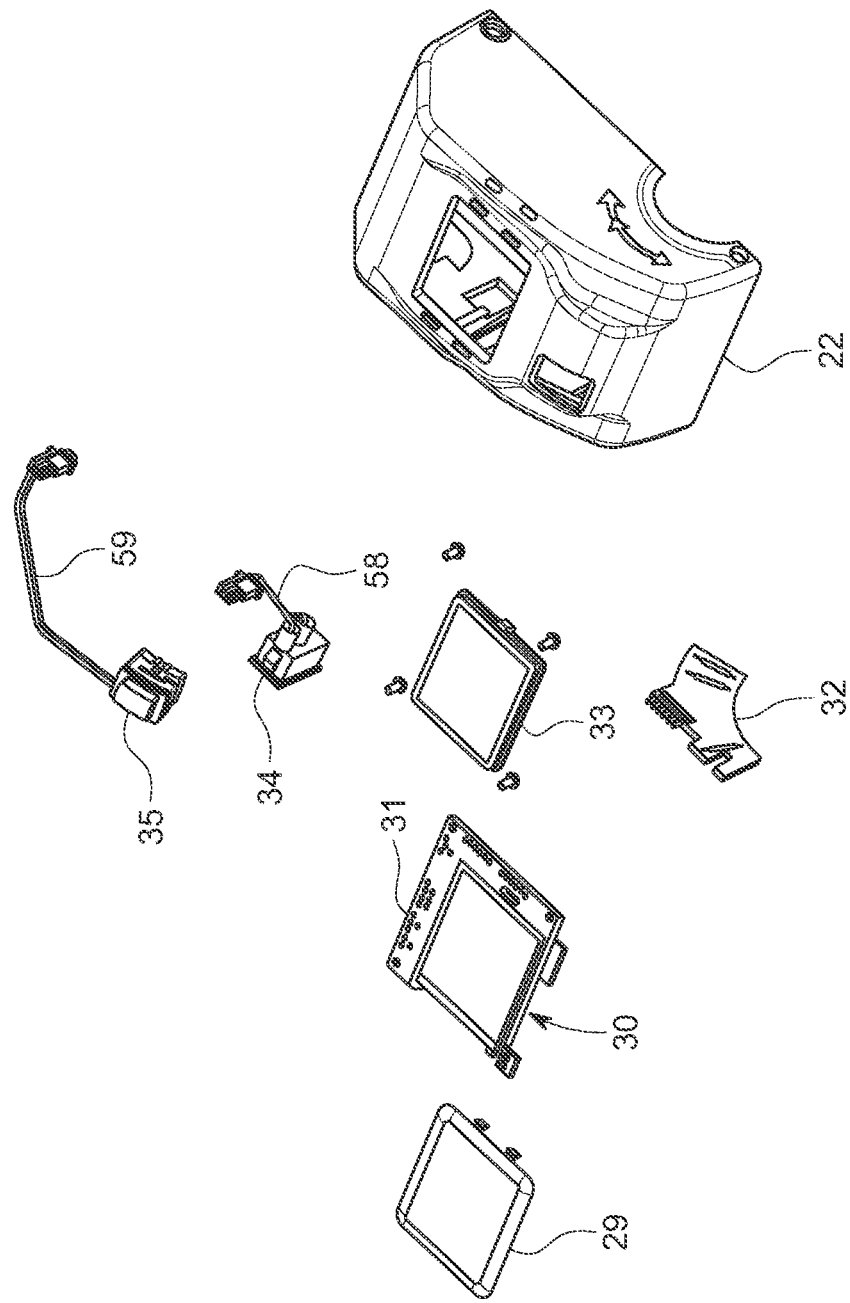
FIG. 3 is an exploded, perspective view of the control head of the electric cart shown in FIG. 1.

As shown in FIGS. 1 and 2, the steering system of the electric cart (100) comprises means for steering the cart and includes a steering column (10), a steering box (24), and a handle (54). The handle (54) is disposed on an upper end of the steering column (10) and includes hand grips (15). A lower end of the steering column (10) is supported by the steering box (24). A steering column harness (27), a steering fork (38), a steering gear (60), and a steering chain (39) are also comprised by the steering system.

Electric Power System

The electric power system of the electric cart (100) includes a hub motor (4), a battery (44), a battery charger (43), a power entry harness (42), a battery harness (25), and a motor harness (26). Preferably, the battery charger (43) is a 10-amp charger, although other suitable chargers could be used instead. It is also preferable that the battery (44) is a 39-amp hour battery, however, other suitable batteries could be substituted therefor. In addition, a conventional charger cord (not shown) is used with the electric power system.

Control System

The control system of the electric cart (100) comprises means for controlling the cart and includes a cart throttle (48), a seat control device (56), a control head (9), a motor controller (21), an emergency stop switch (34), a horn with horn switch (35), and a circuit breaker (20), as shown in FIGS. 1-4, 6 and 7. The emergency stop switch (34) has a stop switch harness (58) and the horn (35) includes a horn switch harness (59).

The control system further comprises a power-stop override that can access a reserved supply of battery power after the hub motor (4) has been deactivated due to a low charge condition of the battery (44). The power-stop override includes a state of charge (SoC) device. The state of charge (SoC) device tracks the battery's capacity and adjusts the estimated run time of the motor (4) based on the battery's remaining charge in order that the reserved supply of battery power is adequate to move the cart (100) to a recharging station.

The cart throttle (48) includes a first printed circuit board assembly (32), a throttle bridge (18), and a plurality of thumb throttles. The plurality of thumb throttles comprises a right thumb throttle (16) and a left thumb throttle (17). Each of the right (16) and left (17) thumb throttles is a throttle lever and is equipped with respective rare earth magnets (53). The thumb throttles (16, 17) include a neutral position and a non-neutral position. In the neutral position, the hub motor (4) is deactivated and the cart (100) is stopped. Conversely, in the non-neutral position, the hub motor (4) is activated to move the cart (100).

The seat control device (56) includes a seat switch (40) and a seat switch harness (41).

The control head (9) has a display (30) and a control housing (57). The display (30) is preferably a liquid crystal display (LCD), but can be of any suitable type. The control housing (57) includes upper (22) and lower (23) control box enclosures and a housing clamp (19). The control housing (57) contains the display (30) therein. The display (30) has a second printed circuit board assembly (31), a removable lens (29), and a display gasket (33). The second printed circuit board assembly (31) determines the output of the display (30).

The emergency stop switch (34) is connected to the first printed circuit board assembly (32) via the stop switch harness (58) and is further connected to the motor controller (21) and motor (4) such that when the emergency stop switch (34) is activated, the motor (4) is deactivated and the cart (100) stops.

Perimeter Guardian System

The perimeter guardian system of the electric cart (100) comprises means for containing movement of the cart within programmed zones and includes a global positioning system (GPS) device that can be programmed to set an operational zone (the selected zone of use), a warning zone, and a stop zone. The perimeter guardian system controls the movement of the electric cart (100) and deters drive-off theft of the cart (100). Also, the GPS device can be preprogrammed with a warning zone barrier and stop zone barrier positioned around the operational zone.

On the cart body (101), the primary receptacle (11) includes a receptacle support (12) that holds the primary receptacle (11) above the protective shell (51) of the frame (1) at a spaced distance above the platform (49). The receptacle support (12) is preferably tubular-shaped.

The seat supports (7) are preferably U-shaped tubular legs that extend upwardly from the platform (49) to hold the cradle (50) at a desired seating height.

Preferably, the frame (1) of the electric cart is comprised of steel and shaped to create a solid foundation. However, other suitable materials could be substituted for steel.

The magnets (53) on each of the left (17) and right (36) thumb throttles are preferably rare earth magnets. Such type of magnet provides superior performance over extended periods of time. However, other suitable magnets could be used instead.

Preferably, the primary (11) and secondary (14) receptacles are equipped with protective corner bumpers (not shown) to protect against injury or damage to nearby shoppers, carts, store displays and the receptacles themselves. The protective corner bumpers can be made of a cushioning material, such as rubber or plastic.

A receptacle-mounted crutch and cane holder can be included on the cart (100), if desired. Also, an oxygen tank holder can be mounted on the cart (100). These accessories (not shown) can provide additional storage specific to the needs of the users.

The frame (1) of the cart body (101) supports the seat (6), the power system, and the control system of the electric cart (100).

The protective shell (51) surrounds the battery (44) and protects the battery (44) from damage.

The display (30) of the control head (9) has a diagnostic menu that helps to diagnose issues with the cart and a service menu that gives user instructions. By entering the diagnostic menu, maintenance/service personnel can view various diagnostic information, including battery voltage and current draw through the motor controller (21). GPS location and error codes can be accessed through the display (30). The display (30) also indicates the state of charge of the battery, the hours of operation, and operational errors.

The service menu appearing on the display (30) provides assistance to users by readily indicating greetings, operational instructions and the operational status of the electric cart (100). Input from the second printed circuit board (31) for the display (30) determines the output on the display (30).

Additionally, the display (30) can have a charge indicator which indicates that power is being provided to the cart's battery charger (43) in order to recharge the battery (44).

When the battery (44) of the electric cart (100) reaches a point of low charge condition, the electric cart (100) cuts off. When the cart (100) is cut off, the motor (4) cannot be activated by the user to move the cart. The battery (44) can cut off when the cart (100) is a distance from the recharging area. Unfortunately, the user is often stranded and the cart (100) has to be manually moved to the recharging area to recharge the battery (44) for future use.

However, the control system of the electric cart (100) has a power-stop override. The power-stop override overrides the power cutoff and accesses a reserved supply of battery power to run the cart (100). Hence, when activated, the power-stop override allows extra run time for the cart (100). The extra run time allows the motor (4) to power the cart (100) for a short amount of time without having to recharge the battery (44). As such, the cart (100) can be driven to the recharging area rather than having to be pushed or pulled manually. The adaptive state of charge (SoC) device tracks the capacity of the battery (44) and adjusts the estimated run time of the motor (4) so that after the cart's power has been cutoff, there is still enough run time left in the battery (44) to move the cart (100) a short distance to the recharging area. Therefore, the power-stop override allows a maintenance person to access the battery's reserved supply in order to extend the cart's run time.

The throttle bridge (18) ties the right (16) and left (17) thumb throttles together so that the thumb throttles (16, 17) act in unison. Consequently, either or both of the thumb throttles (16, 17) can be used when driving the electric cart (100). Each of the magnets (53) on the right (16) and left (17) thumb throttles function as a magnetic spring to return the throttle (48) to the neutral position when the thumb throttles (16, 17) are released and a pressing force ceases to be applied to the thumb throttles (16, 17).

The earth magnets (53) also function to determine the positions of the thumb throttles (16, 17). The thumb throttles (16, 17) can be readily manipulated into selected positions by the user. The particular positions selected by the user are sent via the cart throttle (48) to the motor controller (21). In turn, the motor controller (51) prompts the hub motor (4) to operate in accord with the designated positions of the thumb throttles (16, 17).

The primary (11) and secondary (14) receptacles provide storage for a user to carry personal items or shopping items on the cart (100). The cord receptacle (5) is a convenient container for holding the cord used for recharging the cart (100) at an electrical outlet.

The perimeter guardian system comprises a cart containment program that monitors the location of the cart (100) in order to contain the cart (100) in a designated area (operational zone) and emits signals when the cart is outside of the designated area. When the cart (100) moves outside of the operational zone and into the warning zone, the perimeter guardian system emits a first signal to warn a user that the cart (100) has left the operational zone and entered into the warning zone. In a preferred embodiment, the first signal is an audible sound and a visual indicator, such as a U-turn signal, which appears on the display (30). The cart (100) remains fully operational in the warning zone.

When the cart (100) goes beyond the warning zone and into the stop zone, the cart issues a more strident second signal than the first signal. Preferably, the second signal comprises an audible sound that is a continuous alarm and a visual indicator which appears in flashing red on the display (30). Also, the cart's motor runs in interrupted bursts of power.

The perimeter guardian system inhibits users from removing a cart (100) from the operational zone, thereby inhibiting theft and loss of the carts.

In practice, when at least one of the thumb throttles (16, 17) is pressed, the hub motor (4) is activated and the cart (100) moves in response thereto. To stop the cart (100), the thumb throttles (16, 17) are released. When the thumb throttles (16, 17) are released, the magnets (53) act to return the throttles (16, 17) to the neutral position and the hub motor (4) is deactivated, thereby stopping the cart (100).

To operate the cart (100), one or both of the thumb throttles (16, 17) are pressed with enough force to overcome the magnetic attraction of the earth magnets (53) holding the throttles (16, 17) in the neutral position. As the thumb throttles (16, 17) are moved out of the neutral position and into the non-neutral position, the hub motor (4) is activated and the cart (100) begins to move.

The required force to move the thumb throttles (16, 17) decreases as the thumb throttles (16, 17) move away from the neutral position. Conversely, the required force to move the thumb throttles (16, 17) increases as the thumb throttles (16, 17) move closer to the neutral position. Similarly, the required force to hold the thumb throttles (16, 17) in place is related to the throttle's proximity to the neutral position. The closer the thumb throttles (16, 17) are to the neutral position, the more force is required to hold the throttles (16, 17) in that position. Therefore, the farther the thumb throttles (16, 17) are from the neutral position, the less force is required to hold the throttles (16, 17) in position.

Consequently, the magnets (53) on the cart throttle (48) render it easier for the user to progressively increase cart speed and to hold the thumb throttles (16, 17) in position at a more advanced speed. Once the desired speed is attained, the user can easily maintain that desired speed by holding the thumb throttles (16, 17) in place with less effort than at a slower speed.

The seat supports (7) are preferably tubes that are mounted on the platform (49) of the frame (1) and support the cradle (50) thereon.

The primary receptacle (11) is mounted above the battery (44) and rests on the receptacle support (12). The secondary receptacle (14) serves as auxiliary storage and is mounted on the seat supports (7) under the cradle (50) of the seat (6).

Each of the rear wheels (2) is rotatably mounted on a respective rear axle bolt (45). The rear axle bolt (45) of each of the rear wheels (2) is secured to the platform (49) by a respective wheel backing plate (47) and a respective wheel stiffener (46).

The circuit breaker (20) is supported on the circuit breaker bracket (28) that is mounted within the protective shell (51) of the frame (1).

The upper (22) and lower (23) control box enclosures of the control housing (57) are mounted on the handle (54) of the steering system by the housing clamp (19).

Within the steering system, the handle (54) is mounted on the steering column (10) which is pivotally mounted within the steering box (24). The steering chain (39) communicates between the steering gear (60) disposed on the steering column (10) and the steering fork (38) mounted on the front wheel (52). As the steering column (10) is pivoted by a user via the handle (54), the steering chain (39) is advanced by the rotational movement of the steering gear (60). The movement of the steering chain (39) imparts rotational movement to the steering fork (38) to thereby turn the front wheel (52). The hub motor (4) is disposed within the front wheel (52) on the cart (100). The front wheel (52) is controlled by the steering system that guides the direction of the front wheel (52) and the direction of the cart's movement is determined by the position of the front wheel (52).

The chain operated steering system has a 2:1 ratio whereby a 45 degree turn of the steering column (10) imparts a full 90 degree turn for the front wheel (52) and the electric cart (100). In cooperation with the hub motor (4), the 2:1 chain operated steering system provides easy maneuverability and a tight turning radius.

The components of the electric power system, including the battery harness (25), the motor harness (26), the battery (44), and the battery charger (43), are contained within the protective shell (51) of the frame (1). The motor controller (21) is also housed within the protective shell (51).

The control head (9) is mounted on the handle (54) of the steering column (10) by the housing clamp (19) and is oriented in such a way that the display (30) can be readily viewed by a user seated on the cradle (50) of the cart body's seat (6).

The perimeter guardian system uses satellite GPS technology to detect the location of the cart (100). Therefore, when the location of the cart (100) is detected by the perimeter guardian system to have been driven from the operational zone into the warning zone, the cart driver is signaled to turn around. Preferably, the display (30) displays a warning signal and an audible alert is issued. When the cart (100) enters into the stop zone, the display (30) charges to a flashing red signal and a continuous audible alarm is emitted. Once in the stop zone, the cart runs in interrupted bursts of power, while still allowing the user to return the cart (100) to the operational zone. Once the cart (100) is returned to the operational zone, normal operations of the cart are resumed.

The display (30) of the control head (9) has a diagnostic menu that displays certain issues or problems that the cart (100) may be having. The display (30) allows for maintenance personnel to be aware of cart problems, to reduce maintenance costs, and to maintain a routine servicing schedule. Using the diagnostics menu can result in reduced repair time and in eliminating unneeded repairs and extra costs.

The electric cart of the present invention has power-stop override that can provide extra run time for the cart after the cart has cutoff due to a low charge condition of the battery. This allows the cart to be driven to a recharging station. The cart has a slate of charge (SoC) device that tracks the battery's capacity and the adjusted run time to allow for the extra battery charge that is accessed by the power-stop override.

The throttle system provides ergonomic benefits for the user, allowing the user to readily manipulate the thumb throttles with his or her digits and to easily maintain the throttles in a desired position. By holding the throttles in the desired position in such a manner, the driver can relax his or her hands, wrists, arms and shoulders so that the driver is less stressed. This extends the length of time that a user can drive the cart.

Although the present invention has been described in considerable detail with reference to certain preferred versions thereof, other versions are possible. Therefore, the spirit and scope of the appended claims should not be limited to the description of the preferred versions contained herein.

The invention claimed is:

1. An electric motorize cart comprising:
   a cart body;
   a control system;
   an electric motor to power the cart;
   a cart throttle;

a battery to power the motor;
a battery charger; and
a steering system;
said control system comprises a power-stop override;
wherein when the power of the battery reaches a low charge condition, the motor is deactivated and the cart is at rest;
wherein when said motor is deactivated due to the low charge condition, said power-stop override can be activated to allow access to a reserved supply of battery power;
wherein said power-stop override includes a state of charge device;
wherein said state of charge device tracks the capacity of the battery and adjusts the estimated run time of the motor based on the battery's state of charge, whereby a reserved supply of battery power is remaining after the motor has been initially deactivated due to the battery's low charge condition;
wherein the reserved supply of battery power is adequate to power the motor and move the cart to a recharging station;
said cart body includes a plurality of rear wheels and a front wheel; and
said electric motor comprises a hub motor disposed in the front wheel; and
said cart throttle comprising at least one thumb throttle, a printed circuit board assembly for controlling the motor, and a plurality of magnets for returning said at least one thumb throttle to a neutral position.

2. The electric motorized cart of claim 1, wherein said at least one thumb throttle comprises left and right thumb throttles;
said thumb throttles comprise neutral and non-neutral positions; wherein in the neutral position, the motor is deactivated and the cart is at rest, and in the non-neutral position, the motor is activated and the cart is moving.

3. An electric motorized cart comprising:
a cart body;
an electric motor;
a control system;
a steering system; and
a perimeter guardian system;
wherein the perimeter guardian system comprises a global positioning system, wherein said global positioning system uses satellite technology to enable the perimeter guardian system to monitor the location of the cart.

4. The electric motorized cart of claim 3, wherein said perimeter guardian system includes a programmed operational zone in which the cart can freely move.

5. The electric motorized cart of claim 4, wherein said perimeter guardian system further includes a programmed warning zone, wherein when the cart moves into said warning zone, the perimeter guardian system issues at least one warning signal.

6. The electric motorized cart of claim 5, wherein said control system comprises a display having a printed circuit board assembly; and
wherein when the cart moves into said warning zone, the perimeter guardian system emits a first audible signal and presents a first visual signal on the display.

7. The electric motorized cart of claim 4, wherein said perimeter guardian system further includes a programmed stop zone, wherein when the cart moves into said stop zone, the perimeter guardian system issues at least one warning signal.

8. The electric motorized cart of claim 7, wherein when the cart enters into said stop zone, the perimeter guardian system emits an audible signal and presents a visual signal on the display, and intermittently cuts off power to the motor.

9. The electric motorized cart of claim 4, wherein said perimeter guardian system further includes a programmed warning zone and a programmed stop zone, wherein when the cart moves into said warning zone, the perimeter guardian system issues at least one warning signal and when the cart moves into said stop zone, the perimeter guardian system issues at least one other warning signal.

10. The electric motorized cart of claim 9, wherein said control system comprises a display having a printed circuit board assembly; and
wherein when the cart moves into said warning zone, the at least one warning signal issued by the perimeter guardian system in the warning zone comprises a first audible signal and a first visual signal presented on the display; and
wherein when the cart enters into said stop zone, the at least one other warning signal issued by the perimeter guardian system in the stop zone comprises a second audible signal, a second visual signal displayed on the display, and intermittently cuts off power to the motor.

11. The electric motorized cart of claim 10, wherein said second audible signal is stronger than said first audible signal.

12. An electric motorized cart comprising:
a cart body;
a hub motor;
a battery;
a cart throttle;
a steering system; and
a motor controller;
wherein said cart throttle comprises at least one thumb throttle, a printed circuit board assembly, and a plurality of magnets.

13. The electric motorized cart of claim 12, wherein each of said magnets comprises an earth magnet.

14. The electric motorized cart of claim 12, wherein said at least one thumb throttle comprises neutral and non-neutral positions;
wherein in the neutral position, the hub motor is deactivated and the cart is at rest; and in the non-neutral position the hub motor is activated and the cart is moving.

15. The electric motorized cart of claim 14, wherein said magnets return the at least one thumb throttle to the neutral position from the non-neutral position.

16. The electric motorized cart of claim 14, wherein said magnets detect the position of the at least one thumb throttle.

17. The electric motorized cart of claim 15, wherein said motor controller activates and deactivates the hub motor; whereby when the hub motor is activated the cart moves, and when the hub motor is deactivated the cart stops;
wherein when the at least one thumb throttle is in the non-neutral position, a signal is sent by the printed circuit board assembly to the motor controller to activate the hub motor; and when the at least one thumb throttle is in the neutral position, a signal is sent by the printed circuit board assembly to the motor controller to deactivate the hub motor.

18. The electric motorized cart of claim 17, wherein the force required to move the at least one thumb throttle decreases as the thumb throttle moves away from the neutral position; and the force required to move the thumb throttle increases as the thumb throttle moves toward the neutral position.

19. The electric motorized cart of claim 18, wherein said at least one thumb throttle comprises a left thumb throttle and a right thumb throttle.

20. The electric motorized cart of claim 19, wherein said cart throttle includes a throttle bridge; wherein said throttle bridge ties the left and right thumb throttles together, whereby the thumb throttles move in unison.

21. The electric motorized cart of claim 12, wherein said steering system comprises a steering column, a steering fork, a steering chain, and a steering gear; and
    said cart body comprises a front wheel and a plurality of back wheels;
    wherein said steering fork is attached to said front wheel, said steering gear is mounted on a lower end of said steering column, and said steering chain is engaged with said steering gear and said steering fork; and when said steering column is turned, the steering chain imparts rotational movement to the steering fork to turn the front wheel and the cart.

22. The electric motorized cart of claim 21, wherein the steering system has a 2:1 ratio between the steering gear and the steering fork, whereby a turn of the steering column imparts a turn of the wheel that is twice the magnitude of the turn of the steering column.

23. An electric motorized cart comprising:
    a cart body;
    an electric power system;
    a control system;
    a steering system; and
    a perimeter guardian system;
    wherein said cart body comprises a seat, a frame, a plurality of rear wheels, a front wheel, primary and secondary receptacles, a cord receptacle and a receptacle support;
    said seat comprises a cradle and seat supports;
    said frame comprises a platform, a front stabilizer, and a protective shell; wherein the frame supports the seat, the power system, and the control system thereon; and said cradle is mounted on said seat supports that are mounted on the platform of the frame;
    said protective shell includes front and back covers, and a front plate cover;
    each of said rear wheels includes a rear axle bolt, a wheel backing plate, and a wheel stiffener; wherein each of the rear wheels is rotatable mounted on a respective rear axle bolt, each of the rear axle bolts are secured to the platform by a respective wheel backing plate and a respective wheel stiffener;
    wherein said primary receptacle is mounted on said receptacle support, and the secondary receptacle is mounted on the seat supports;
    said electric power system comprises a hub motor, a battery, a battery charger, a power entry harness, a battery harness, and a motor harness; wherein said hub motor is disposed in the front wheel of the cart;
    said control system comprises a power-stop override, a cart throttle, a seat control device, a control head, a motor controller, an emergency stop switch, a horn, and a circuit breaker; wherein the motor controller, the battery harness, the motor harness, the battery, and the battery charger are disposed in the protective shell of the frame;
    said power-stop override comprises a state of charge device;
    said horn includes a horn switch harness;
    said circuit breaker includes a circuit breaker bracket for mounting the circuit breaker in the protective shell of the frame;
    said seat control device includes a seat switch and a seat switch harness;
    said cart throttle includes right and left thumb throttles, a first printed circuit board assembly, a throttle bridge, and a plurality of magnets; wherein the throttle bridge ties the right and loft thumb throttles together whereby the thumb throttles move in unison;
    said emergency stop switch includes a stop switch harness; wherein when the emergency stop switch is activated, the hub motor is deactivated to stop the cart;
    said thumb throttles comprise neutral and non-neutral positions; wherein when in the neutral position, the hub motor is deactivated and in the non-neutral position, the hub motor is activated;
    said steering system comprises a steering column, a handle, a steering box, a steering fork, a steering chain, a steering gear, and a steering column harness; wherein said handle is disposed on an upper end of said steering column, a lower end of said steering column is supported by said steering box, said steering gear is disposed on a lower end of said steering column, said steering fork is disposed on said front wheel, and said steering chain engages said steering gear and said steering fork; wherein when the steering column is pivoted, the steering chain is advanced by the rotational movement of the steering gear and imparts rotational movement to the steering fork to turn the front wheel;
    said control head comprises a display and a control housing;
    said display includes a second printed circuit board assembly, a lens and a display gasket; wherein the second printed circuit board assembly determines the output of the display;
    said second printed circuit board assembly includes a diagnostic menu for diagnosing issues with the cart and a service menu for giving user instructions; wherein said diagnostic and service menus can be selectively displayed on said display;
    said control housing comprises upper and lower control box enclosures and a housing clamp for securing the upper and lower control box enclosures to the handle on the steering column; wherein the control housing contains the display;
    said perimeter guardian system monitors the location of the cart and includes a cart containment program that comprises a global positioning system; wherein said global positioning system uses satellite technology to track the location of the cart and includes a programmed operational zone, a warning zone, and a stop zone;
    wherein the cart moves freely within the operational zone,
    wherein when the cart moves outside of the operational zone and into the warning zone, the perimeter guardian system emits a first audible signal and a U-turn signal appears on the display;
    wherein when the cart moves beyond the warning zone and enters into said stop zone, the perimeter guardian system emits a second signal that is a continuous audible alarm, causes a visual indicator to appear in flashing red on the display, and intermittently cuts off power to the motor;
    wherein, as the thumb throttles are moved away from the neutral position, the force required to move the thumb throttles decreases; and, as the thumb throttles are moved toward the neutral position, the force required to move the thumb throttles increases;

wherein the speed of the cart is based on the selected position of the thumb throttles and conveyed by the motor controller to the hub motor;

wherein when the thumb throttles are released, the magnets return the thumb throttles to a neutral position, the first printed circuit board assembly signals the position of the thumb throttles to the motor controller, and the motor controller deactivates the hub motor to thereby stop the cart;

wherein to operate the cart, at least one of said thumb throttles is pressed with enough force to overcome the attraction of the magnets and as the thumb throttles are moved out of the neutral position and into the non-neutral position, the position of the thumb throttles is conveyed to the motor controller, which prompts the motor controller to activate the hub motor that then moves the cart;

wherein to stop the cart, said thumb throttles are released and said magnets return the thumb throttles to the neutral position, whereby the hub motor is deactivated and the cart comes to rest;

wherein, when the power of the battery reaches a low charge condition, the hub motor is deactivated;

wherein said state of charge device tracks the battery's capacity and adjusts the estimated run time of the hub motor based on the battery's state of charge, so that a reserved supply of battery power is remaining after the hub motor has been initially deactivated due to the battery's low charge condition; wherein the reserved supply of the battery power is adequate to power the hub motor and move the cart to a recharging station; and when said hub motor is deactivated due to the low charge condition, said power-stop override can be activated to allow access to the reserved supply of battery power, thereby enabling the hub motor to activate and move the cart.

\* \* \* \* \*